US008547971B1

(12) United States Patent
Mizrahi (10) Patent No.: US 8,547,971 B1
(45) Date of Patent: Oct. 1, 2013

(54) MULTI-STAGE SWITCHING SYSTEM (75) Inventor: Tal Mizrahi, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 506 days.

(21) Appl. No.: 12/683,221

(22) Filed: Jan. 6, 2010

Related U.S. Application Data (60) Provisional application No. 61/143,011, filed on Jan. 7, 2009.

(51) Int. Cl.
H04L 12/50 (2006.01)
(52) U.S. Cl.
USPC ........................................................ 370/369
(58) Field of Classification Search
USPC .................................. 370/356, 369, 389, 392
See application file for complete search history.

(56) References Cited

U.S. PATENT DOCUMENTS

| 6,807,179 | B1 * | 10/2004 | Kanuri et al. ............ 370/395.31 |
| 7,443,790 | B2 | 10/2008 | Aicklen et al. |
| 7,636,319 | B2 * | 12/2009 | Shankar et al. ............... 370/249 |
| 2007/0168531 | A1 * | 7/2007 | Sitaraman et al. ............ 709/229 |
| 2008/0037531 | A1 * | 2/2008 | Donoghue et al. ............ 370/386 |
| 2008/0315985 | A1 * | 12/2008 | Johnsen et al. ............... 340/2.22 |
| 2009/0196303 | A1 | 8/2009 | Battle et al. |
| 2010/0046537 | A1 | 2/2010 | Perlmutter et al. |
| 2010/0142398 | A1 * | 6/2010 | Arad et al. ..................... 370/252 |
| 2011/0007741 | A1 * | 1/2011 | Kreeger et al. ................ 370/389 |
| 2011/0164616 | A1 * | 7/2011 | Kloth et al. .................... 370/392 |

* cited by examiner

Primary Examiner — Dang Ton
Assistant Examiner — Nourali Mansoury (57) ABSTRACT

A multi-stage switching system comprises a first stage including a plurality of groups of switching devices. Each group of switching devices includes more than one switching device, and each group of switching devices is associated with a corresponding single device identifier (ID). A second stage includes a plurality of switching devices. The switching devices of the first stage are coupled to the switching devices of the second stage via a plurality of uplinks. Switching devices of the first stage are configured to associate a target device ID and a target port ID to a data unit received via a front port of the switching system. The switching devices of the first stage and the switching devices of the second stage are configured to direct the data unit through the switching system using the target device ID and a target port ID.

17 Claims, 7 Drawing Sheets

MULTI-STAGE SWITCHING SYSTEM

CROSS-REFERENCE TO RELATED APPLICATION

This application that claims the benefit of U.S. Provisional Patent Application No. 61/143,011, entitled "Multi-Stage Forwarding Scheme," which was filed on Jan. 7, 2009, the entire disclosure of which is hereby incorporated by reference herein.

FIELD OF THE DISCLOSURE

The present disclosure relates generally to communication networks and, more particularly, to switching devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some networking applications require switching between a high number of ports. For example, a typical data center includes a large number of servers, and switches to communicatively couple the servers to outside network connections, such as backbone network links. As another example, a high-volume website server system (server farm) can include a large number of web servers, and switches to communicatively couple the web servers to backbone network links.

In such applications, switching systems capable of switching between a high number of ports are utilized so that traffic from a backbone network line can be routed to a large number of servers, and vice versa. Such switching systems can include a large number of switches, and each switch can be capable of switching between several ports.

In data centers and server farms, multiple layers of switches are often utilized to enable routing data between each server and a backbone network link and/or between each server and a large number of other servers. For example, a first layer of switches may provide ports to which servers and network links may be connected. A second layer of switches may interconnect the first layer of switches.

SUMMARY

In an embodiment, a multi-stage switching system comprises a first stage comprising a plurality of groups of switching devices, wherein each group of switching devices includes more than one switching device, and wherein each group of switching devices is associated with a corresponding single device identifier (ID). The multi-stage switching system also comprises a second stage comprising a plurality of switching devices. The switching devices of the first stage are coupled to the switching devices of the second stage via a plurality of uplinks. Switching devices of the first stage are configured to associate a target device ID and a target port ID to a data unit received via a front port of the switching system. The switching devices of the first stage and the switching devices of the second stage are configured to direct the data unit through the switching system using the target device ID and a target port ID.

In another embodiment, a switching device comprises a plurality of ports, a memory, and a forwarding engine coupled to the plurality of ports and to the memory. The forwarding engine includes an egress engine to determine an egress port via which a data unit having a forwarding tag is to be transmitted. The forwarding tag includes a target device identifier (ID) and a target port ID. When the target device ID is a device ID of the switching device, the egress engine is configured to determine whether device map lookup is enabled, and utilize a device map table stored in the memory to determine an egress port via which the data unit should be transmitted when it is determined that device map lookup is enabled. When the target device ID is a device ID of the switching device, the egress engine is also configured to transmit the data unit via the determined egress port when it is determined that device map lookup is enabled, and transmit the data unit via a port corresponding to the target port ID when it is determined that device map lookup is not enabled.

In yet another embodiment, a switching method includes receiving a data unit via a port of a switching device in a multi-stage switching system, and determining whether a target device identifier (ID) in a forwarding tag associated with the data unit is the same as a device ID of the switching device. The switching method also includes determining whether a device map lookup is enabled for the data unit, and utilizing a device map table stored in a memory of the switching device to determine an egress port via which the data unit should be transmitted when it is determined that device map lookup is enabled when the target device ID is the same as the device ID of the switching device. The switching method further includes transmitting the data unit via the determined egress port when it is determined that device map lookup is enabled, and transmitting the data unit via a port corresponding to a target port ID in the forwarding tag when it is determined that device map lookup is not enabled when the target device ID is the same as the device ID of the switching device.

DETAILED DESCRIPTION

Example switching methods and apparatus are described herein in the context of Ethernet networks. One of ordinary skill in the art will recognize, in light of the disclosure and teachings herein, that similar methods and apparatus are adaptable for use in other communication networks as well.

Figure 1:
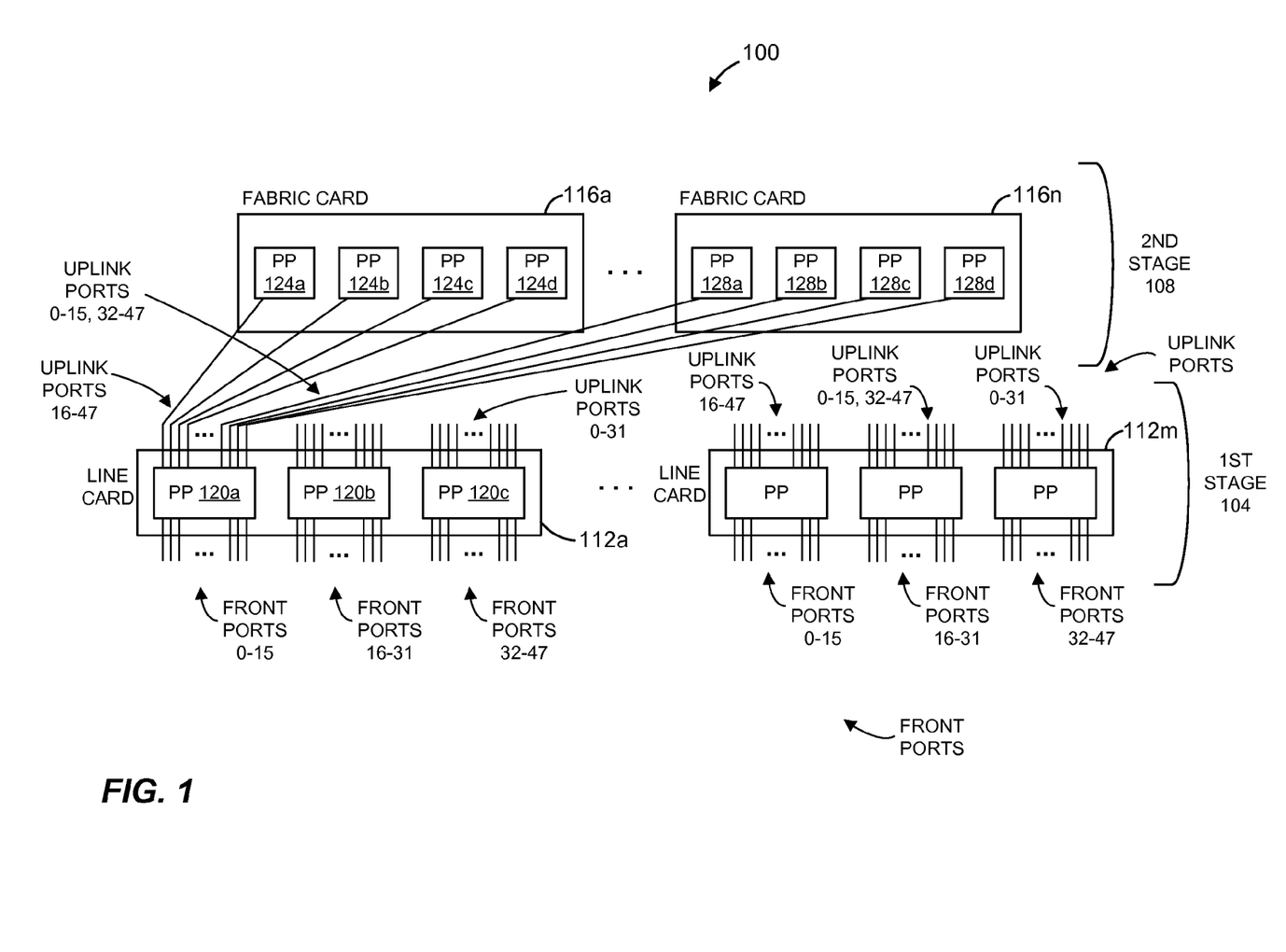
FIG. 1 is a diagram of an example multi-stage switching system in accordance with an embodiment of the disclosure.

FIG. 1 is a diagram of an example multi-stage switching system 100 that is suitable for use in data centers, server farms, or any systems that require switching or routing between a large number of ports, in accordance with an embodiment of the disclosure. The system 100 comprises a plurality of switching stages including a first stage 104 and a second stage 108. The first stage includes a first plurality of ports, referred to herein as front ports. The front ports can be utilized for coupling to local area networks (LANs), wide area networks (WANs), servers, other switching systems, etc. The first stage also includes a second plurality of ports, referred to herein as uplink ports. The uplink ports are utilized for coupling the first stage 104 to the second stage 108 via communication links referred to herein as uplinks. The second stage 108 also includes a plurality of ports that are coupled to the uplinks.

Each stage in the plurality of stages comprises a plurality of packet processors (PPs) arranged in groups. In one embodiment, the first stage 104 comprises M groups of PPs, and the second stage 108 comprises N groups of PPs. In one embodiment, seen in FIG. 1, each group of PPs is arranged on a corresponding card that is mounted in a chassis. In this embodiment, the first stage 104 comprises M cards 112 (referred to herein as "line cards"), and the second stage 108 comprises N cards 116 (referred to herein as "fabric cards"). In this embodiment, the multi-stage switching system 100 can comprise a chassis switching system with M line cards and N fabric cards mounted in a chassis.

For ease of explanation, the groups of PPs in the first stage 104 will be referred to as line cards and the groups of PPs in the second stage 108 will be referred to as fabric cards in the description below. Each group of PPs, however, need not be arranged on a separate card, and may be arranged in any suitable manner of configuration. For instance, in an embodiment (not seen), multiple groups of PPs are arranged on a single card. Additionally, the multi-stage switching system 100 need not be a chassis switching system and the groups of the PPs need not be arranged on cards in a chassis.

Generally speaking, when a data unit is received via one of the front ports, the data unit is forwarded to one of the fabric cards 116. Then, the fabric card 116 forwards the data unit to one of the line cards 112. Then, the data unit is transmitted via one of the front ports.

In the example system 100, each line card 112 comprises three PPs. For example, the line card 112*a* includes a PP 120*a*, a PP 120*b*, and a PP 120*c*. In other embodiments, the line cards 112 may have more or less than three PPs, and each line card 112 need not have the same number of PPs. In the example system 100, each fabric card comprises four PPs. For example, the fabric card 116*a* includes a PP 124*a*, a PP 124*b*, a PP 124*c*, and a PP 124*d*. Also, the fabric card 116*n* includes a PP 128*a*, a PP 128*b*, a PP 128*c*, and a PP 128*d*.

As discussed above, the system 100 comprises a plurality of packet processors (PPs) arranged in stages and groups as discussed above. Each PP is a switching device and itself has a plurality of ports. Generally speaking, each PP is capable of receiving a data unit, such as a packet or frame, and making a decision regarding the port of the PP via which the data unit should be transmitted. Then, the PP transmits the data unit via the determined port of the PP.

In an embodiment, each PP in the first stage 104 is coupled to a plurality of fabric cards 116 via uplinks. For example, each PP in the first stage 104 can be coupled to at least one PP in each of the fabric cards 116. As another example, each PP in the first stage 104 can be coupled to every PP in the second stage 108. As yet another example, each PP in the first stage 104 can be coupled to a different subset of PPs in the second stage 108. In FIG. 1, uplinks between the PP 120*a* and the fabric cards 116*a* and 116*n* are illustrated, whereas other uplinks, such as uplinks between other PPs and the fabric cards 116, are not illustrated to avoid obscuring the figure.

In one embodiment, the system 100 includes sixteen line cards 112 (M=16) and eight fabric cards 116 (N=8), where each line card 112 includes three PPs and each fabric card 116 includes four PPs. In this embodiment, there are thus 48 PPs in the first stage 104 and 32 PPs in the second stage 108. In an embodiment, each PP in the first stage 104 provides 48 ports: 16 front ports and 32 uplink ports. Thus, if there are 48 PPs in the first stage 104, the first stage 104 would provide 768 front ports and 1536 uplink ports.

Each PP in the first stage 104 need not have the same amount of ports as each PP in the second stage 108. In an embodiment, each PP in the first stage 104 includes 48 ports, whereas each PP in the second stage 108 includes 32 ports. In this embodiment, if there are 32 PPs in the first stage 104 and each PP in the first stage 104 provides 24 front ports and 24 uplink ports, the first stage 104 would provide 768 front ports and 768 uplink ports. If there are 24 PPs in the second stage 108 and each PP in the second stage 108 provides 32 ports, the second stage 108 would be capable of connecting to 768 uplinks.

Generally speaking, the first stage 104 may include different numbers of groups of PPs (e.g., line cards 112) and the second stage 108 may include different numbers of groups of PPs (e.g., fabric cards 116). Additionally, each group in the first stage 104 (e.g., line card 112) may have more or less than three PPs, and each group in the second stage 108 (e.g., fabric card 116) may have more or less than four PPs.

In the system 100, each PP in the first stage 104 is configured to make a forwarding decision when a data unit is received via a front port coupled to the PP. In an embodiment, the forwarding decision includes determining a device in the first stage to which the data unit should be forwarded via the second stage (referred to herein as the "target device"). In an embodiment, the determined target device is indicated by a target device identifier (ID). Moreover, in an embodiment, the forwarding decision also includes determining a port of the determined target device to which the data unit should be forwarded (referred to herein as the "target port"). The determined target port may be indicated by a target port ID.

The PP in the first stage 104 is also configured to associate the forwarding decision (e.g., {target device ID, target port ID}) with the data unit. For example, in an embodiment, the forwarding decision (e.g., {target device ID, target port ID}) is a forwarding tag added to a header of the data unit, and other PPs in the system 100 may utilize the forwarding tag to direct the data unit to the target device and the target port. Before the data unit is transmitted from the switch system 100, the {target device ID, target port ID} added to a header of the data unit is removed.

In an embodiment, rather than assigning each PP in the first stage 104 a different device ID, each group of PPs (e.g., each line card 112) is assigned a different device ID, and each PP in a group shares the same device ID. In this embodiment, the device ID can be represented by a smaller number of bits as compared to assigning a different device ID to each PP in the first stage 104. For example, if there were 16 line cards 112, each with three PPs (i.e., 48 PPs in the first stage 104), a device ID corresponding to a different ID for each PP would require six bits. On the other hand, a device ID corresponding to a different ID for each line card 112 (16 line cards) would require only four bits.

In an embodiment, for each PP, each port of the PP has a different port identifier (ID) such as a port number. In an embodiment, each PP in the first stage 104 has 48 ports numbered 0-47. In a group of PPs, each port ID is not unique to the group of PPs. But, in an embodiment, if a device ID corresponds to a group of PPs in the first stage 104, the group of PPs is configured so that each front port corresponding to the group of PPs has a different port ID. In the system of FIG. 1, for example, the line card 112*a* is assigned a unique device ID, and each of the PPs 120 has 48 ports numbered 0-47. The front ports corresponding to the line card 112*a*, however, have different port numbers. For instance, the front ports corresponding to PP 120*a* are port numbers 0-15; the front ports corresponding to PP 120*b* are port numbers 16-31; and the front ports corresponding to PP 120*c* are port numbers 32-47. The other line cards 112 can have similarly numbered front ports (i.e., the front ports of each line card 112 have different port numbers). Thus, in an embodiment, port numbers for front ports are unique with respect to a single line card 112, but are not unique with respect to other line cards 112. For example, with respect to line card 112*a*, there is only one front port numbered 0. But with respect to all of the line cards 112, there are multiple front ports numbered 0.

In an embodiment, the port numbers corresponding to the uplink ports of the group of PPs are not unique. For instance, the uplink ports corresponding to PP 120*a* are port numbers 16-47; the uplink ports corresponding to PP 120*b* are port numbers 0-15, 32-47; and the uplink ports corresponding to PP 120*c* are port numbers 0-31. The other line cards 112 can have similarly numbered uplink ports. Thus, in an embodiment, port numbers for uplink ports are not unique with respect to the single line card 112 or the other line cards 112. For example, with respect to line card 112*a*, there are two front ports numbered 0, and with respect to each of the other line cards 112, there are multiple front ports numbered 0.

In an embodiment, the forwarding tag (e.g., {target device ID, target port ID}) added to a header of the data unit comprises five bits for the target device ID and six bits for the target port ID. In other embodiments, a number of bits other than five can be used for the target device ID and/or a number of bits other than six can be used for the target port ID. In another embodiment, more bits can be used for the target device ID than the target port ID.

In an embodiment, all PPs in the second stage 108 have the same device ID, which is different than the device IDs in the first stage 104. In another embodiment, each fabric card 116 is associated with a different device ID, and all PPs on the same fabric card 116 have the same device ID.

As discussed above, the forwarding tag (e.g., {target device ID, target port ID}) is utilized by PPs in the system 100 to direct a data unit through the system 100 to the correct front port. In an embodiment, each PP in the system 100 includes a device map table, which is a table that associates an egress port of the PP with at least a target device ID. For example, a port of the PP associated with the target device ID is a port of the PP via which the data unit should be transmitted (i.e., an egress port) so that the data unit will eventually reach the target port. In an embodiment, when a received data unit having the forwarding tag {target device ID, target port ID} in the header, the PP utilizes at least the target device ID to look up in the device map table an egress port of the PP via which the data unit should be transmitted. In another embodiment, the PP utilizes at least the target device ID and the target port ID to look up an egress port of the PP in the device map table.

Table 1 is an example device map table for the PP 120*a* of FIG. 1. In the example of Table 1, if a data unit is received and the PP 120*a* makes a forwarding decision that determines that the target device ID is five, the PP 120*a* can utilize the device map table to determine an egress port. In particular, according to Table 1, when the target device ID is five, the PP 120*a* should transmit the data unit via port number 36, which is an uplink port.

TABLE 1

| Target Device ID | Egress Port No. |
|---|---|
| 0 | 16 |
| 1 | 20 |
| 2 | 24 |
| 3 | 28 |
| 4 | 32 |
| 5 | 36 |
| 6 | 40 |
| 7 | 44 |
| 8 | 17 |
| 9 | 21 |
| 10 | 25 |
| 11 | 29 |
| 12 | 33 |
| 13 | 37 |
| 14 | 41 |
| 15 | 45 |

Table 2 provides portions of another example device map table for the PP 120*a* of FIG. 1. In the example of Table 2, if a data unit is received and the PP 120*a* makes a forwarding decision that determines that the target device ID is one, and the target port is 14, the PP 120*a* can utilize the device map table to determine an egress port. In particular, according to table 2, when the target device ID is one and the target port is 14, the PP 120*a* should transmit the data unit via port number 24, which is an uplink port.

TABLE 2

| Target Device ID | Target Port ID | Egress Port No. |
|---|---|---|
| 0 | 16 | 16 |
| 0 | 17 | 16 |
| ... | ... | ... |
| 0 | 30 | 16 |
| 0 | 31 | 16 |
| 0 | 32 | 20 |
| 0 | 33 | 20 |
| ... | ... | ... |
| 0 | 46 | 20 |
| 0 | 47 | 20 |
| 1 | 0 | 24 |
| 1 | 1 | 24 |
| ... | ... | ... |
| 1 | 14 | 24 |
| 1 | 15 | 24 |
| 1 | 16 | 28 |
| 1 | 17 | 28 |
| ... | ... | ... |
| 1 | 30 | 28 |
| 1 | 31 | 28 |
| ... | ... | ... |

In an embodiment, PPs in the second stage 108 utilize device map tables similar to Table 1 or Table 2 to determine the egress port via which a data unit should be forwarded. For example, a PP in the second stage 108 can look up an egress port number in a device map table using at least the target device ID, or at least the target device ID and the target port ID.

In an embodiment, when a data unit received by a PP has a device ID that corresponds to the PP, the PP does not perform a device map lookup. Rather, the PP merely transmits the data unit via the port indicated by the target port ID. As seen in line card 112*a* of FIG. 1, in an embodiment, each uplink port number of the PP 120*a* is the same as a front port number of one of the other PPs 120. Conversely, each front port number of the PPs 120b, 120c is the same as one of the uplink port numbers of the PP 120a. A similar relationship holds for the uplink port numbers of the PPs 120b and 120c. Thus, for example, if a data unit is received by the PP 120a with a target device ID corresponding to the line card 112a and with a target port number between 16 and 47, the PP 120a will transmit the data unit via one of the uplinks to one of the fabric cards 116. The fabric card 116 will then transmit the data unit to the appropriate PP 120b or 120c, which in turn will remove the forwarding tag and transmit the data unit via the front port indicated by the target port ID.

In an embodiment, when a data unit received by a PP has a device ID that corresponds to the PP, the PP does not perform a device map lookup, the device map table may omit entries corresponding to the device ID of the PP. For example, if the device ID of PP 120a is 0, then in Tables 1 and 2, all entries for target device ID 0 could be omitted. Alternatively, entries in the device map table corresponding to the device ID of the PP could be a "don't care" value, a value indicating device map lookup is not enabled for that target device ID, etc. For example, if the device ID of PP 120a is 0, then in Tables 1 and 2, all entries for target device ID 0 could be a "don't care" value, a value indicating device map lookup is not enabled for that target device ID, etc.

Figure 2:
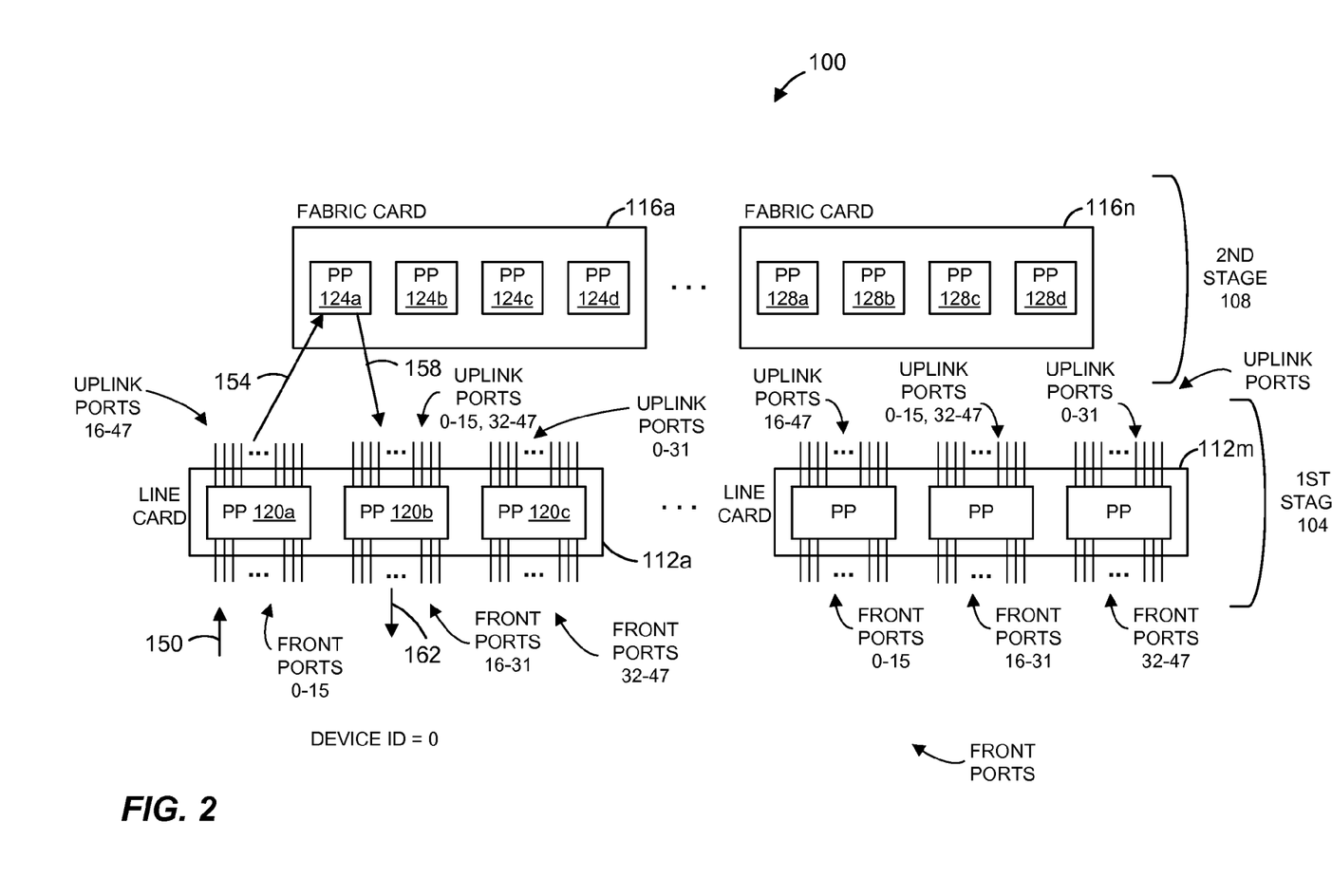
FIG. 2 is an illustration of a data unit being forwarded through the system of FIG. 1.

FIG. 2 is an illustration of a data unit being forwarded through the system 100 of FIG. 1. FIG. 2 is discussed with respect to acts that are performed by the system 100 while the data unit is being processed by the system 100. In FIG. 2, it is assumed that the line card 112a corresponds to device ID 0. At act 150, the data unit is received via port number 5 of the PP 120a. The PP 120a processes the data unit and makes a forwarding decision, deciding that the target device ID is 0 and the target port ID is 20. The PP 120a then adds a forwarding tag to a header of the data unit.

Because the target device ID is 0, the PP 120a does not perform a device map lookup. Rather, the PP 120a transmits the data unit via the port indicated by the target port ID, which corresponds to one of the uplink ports of the PP 120a. Thus, at act 154, the PP 120a transmits the data unit to the PP 124a in the fabric card 116a.

Because the target device ID is different than the device ID corresponding to the PP 124a, the PP 124a performs a device map lookup using information in the forwarding tag, and determines an egress port via which the data unit should be transmitted. Thus, at act 158, the PP 124a transmits the data unit to the PP 120b.

Because the target device ID is 0, the PP 120b does not perform a device map lookup. Rather, the PP 120b transmits the data unit via the port indicated by the target port ID, which corresponds to one of the front ports of the PP 120b. Prior to transmitting the data unit, the PP 120b strips the forwarding tag from the data unit. At act 162, the PP 120b transmits the data unit via the front port 20 of the line card 112a.

If, in the example illustrated in FIG. 2, the PP 120a had determined that the target device ID was 0 and the target port ID was 5, the PP 120a would transmit the data unit via the port 5 without first forwarding the data unit to the second stage 108.

In the example of FIG. 2, the data unit is ingressed and egressed via the same line card 112a. More generally, however, a data unit can be ingressed and egressed via different line cards 112. When the target device ID is different than the device ID of the PP that receives the ingressing data unit, the PP utilizes the device map table to determine the port via which the data unit is to be transmitted to the second stage 108. Then, the PP in the second stage 108 that receives the data unit uses its device map table to determine the port via which the data unit is to be transmitted to the appropriate line card 112. In this way, a data unit received by one line card is directed to another line card, via the second stage 108, for transmission.

In another embodiment, when a data unit received by a PP has a device ID that corresponds to the PP, the PP performs a device map lookup at least in some circumstances. For example, a data unit received by a PP has a device ID that corresponds to the PP, the PP performs a device map lookup based on the source port (i.e., the port via which the data unit was received) and/or the target port indicated by the target port ID.

Figure 3:
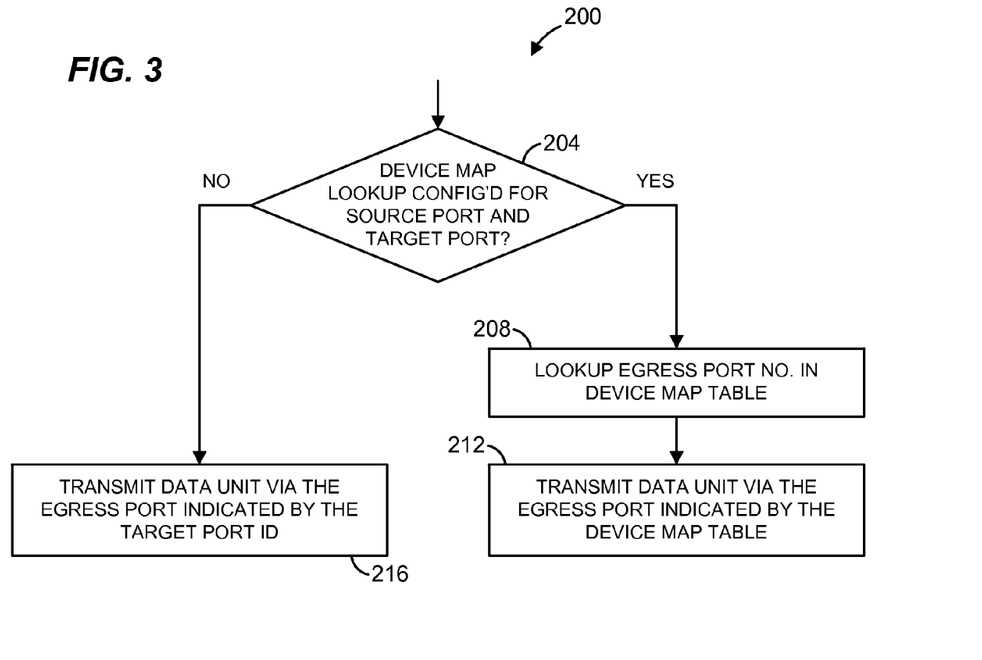
FIG. 3 is a flow diagram of a method that can be implemented by a packet processor (PP) of the system of FIG. 1, in accordance with an embodiment of the disclosure.

FIG. 3 is a flow diagram of an example method 200 that is suitable to be implemented by a PP when the PP receives a data unit having the forwarding tag {target device ID, target port ID} in the header, in accordance with an embodiment of the disclosure. The forwarding tag may be included in the data unit as received, or the PP may have added the forwarding tag to the data unit after receiving the data unit. More particularly, the method 200 is suitable to be implemented when the target device ID is the same as the device of ID of the PP that received the data unit.

At block 204, it is determined whether device map lookup is enabled for the source port (i.e., the port via which the data unit was received) and for the target port indicated by the target port ID. Referring to PP 120a of FIG. 1, for example, in an embodiment device map lookup is configured for source ports 0-15 (i.e., the front ports of the PP 120a) and for target ports 16-47.

If it is determined at block 204 that device map lookup is enabled for the source port (i.e., the port via which the data unit was received) and for the target port indicated by the target port ID, the flow proceeds to block 208. At block 208, an egress port number is determined using a device map table. In one embodiment, a lookup in the device map table is performed using the target device ID in the forwarding tag. In this embodiment, the device map table may be similar to Table 1. In another embodiment, a lookup in the device map table is performed using the target device ID and the target port ID. In this embodiment, the device map table is similar to Table 2, for example. At block 212, the data unit is transmitted via the egress port indicated by the egress port number determined at block 208.

On the other hand, if it is determined at block 204 that device map lookup is not enabled for the source port (i.e., the port via which the data unit was received) and/or for the target port indicated by the target port ID, the flow proceeds to block 216. At block 216, the data unit is transmitted via the egress port indicated by the target port ID in the forwarding tag.

Figure 4:
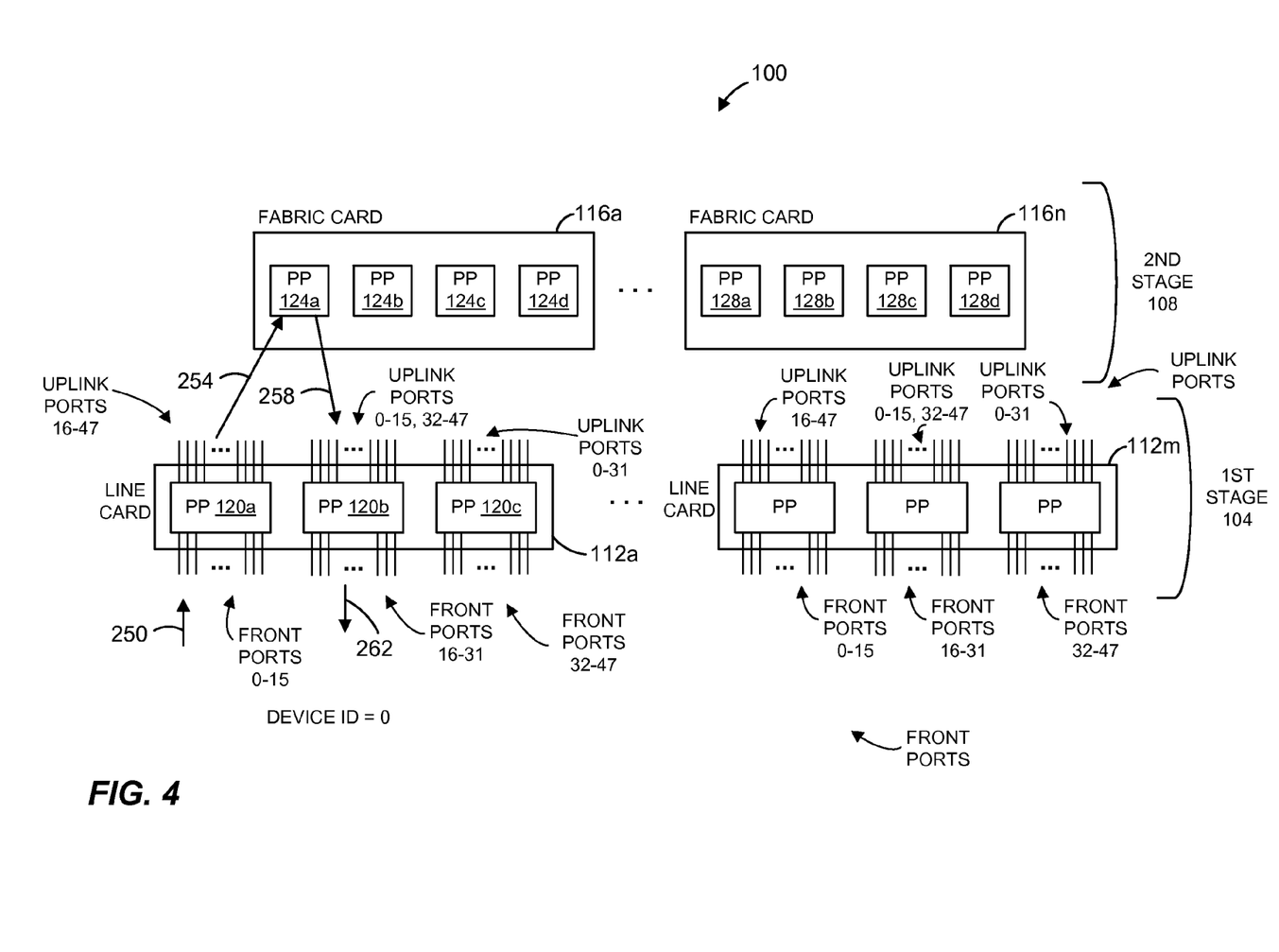
FIG. 4 is another illustration of a data unit being forwarded through the system of FIG. 1, in accordance with an embodiment of the disclosure.

FIG. 4 is an illustration of a data unit being forwarded through the system 100 of FIG. 1, in which the PPs implement the method 200 of FIG. 3. Thus, PPs in the line cards 112 perform a device map lookup even when the target device ID for a data unit is the same as the device ID of the PP, at least in some circumstances (e.g., when a source port and/or target port are configured for device map lookup). FIG. 4 is discussed with respect to acts that occur while the data unit is being processed by the system 100. In FIG. 4, it is assumed that the line card 112a corresponds to device ID 0 and that source ports 1-15 and target ports 16-47 of PP 120a are enabled for device map lookup. It is also assumed that target port 20 of PP 120b is not enabled for device map lookup.

At act 254, the data unit is received via port number 5 of the PP 120a. The PP 120a processes the data unit and makes a forwarding decision, deciding that the target device ID is 0 and the target port ID is 20. The PP 120*a* then adds a forwarding tag to a header of the data unit.

Because the target device ID is 0 and because the source port 5 and the target port 20 are enabled for device map lookup, the PP 120*a* performs a device map lookup based at least on the target device ID, or based at least on the target device ID and the target port ID. The PP 120*a* determines the egress port number is 25 based on the device map lookup. Thus, at act 254, the PP 120*a* transmits the data unit to the PP 124*a* in the fabric card 116*a* via uplink port 25.

Because the target device ID is different than the device ID corresponding to the PP 124*a*, the PP 124*a* performs a device map lookup using information in the forwarding tag, and determines an egress port via which the data unit should be transmitted. Thus, at act 258, the PP 124*a* transmits the data unit to the PP 120*b*.

Because the target device ID is 0, and because the target port ID is not enabled for device map lookup, the PP 120*b* does not perform a device map lookup. Rather, the PP 120*b* transmits the data unit via the port indicated by the target port ID, which corresponds to one of the front ports of the PP 120*b*. Prior to transmitting the data unit, the PP 120*b* strips the forwarding tag from the data unit. At act 262, the PP 120*b* transmits the data unit via the front port 20 of the line card 112*m*.

If, in the example illustrated in FIG. 4, the PP 120*a* had determined that the target device ID was 0 and the target port ID was 10, the PP 120*a* would perform a device map lookup if the source port 5 and the target port 10 were enabled for device map lookup. If the device map lookup indicated an egress port that is an uplink port, the data unit would first be transmitted to the second stage 108. Thus, in some embodiments, a PP may transmit a data unit to the second stage 108 even if the target port were a front port of the same PP, in some circumstances (e.g., if the source port and the target port were enabled for device map lookup).

In the example of FIG. 4, the data unit is ingressed and egressed via the same line card 112*a*. More generally, however, a data unit can be ingressed and egressed via different line cards 112 as described with respect to FIG. 2.

Figure 5:
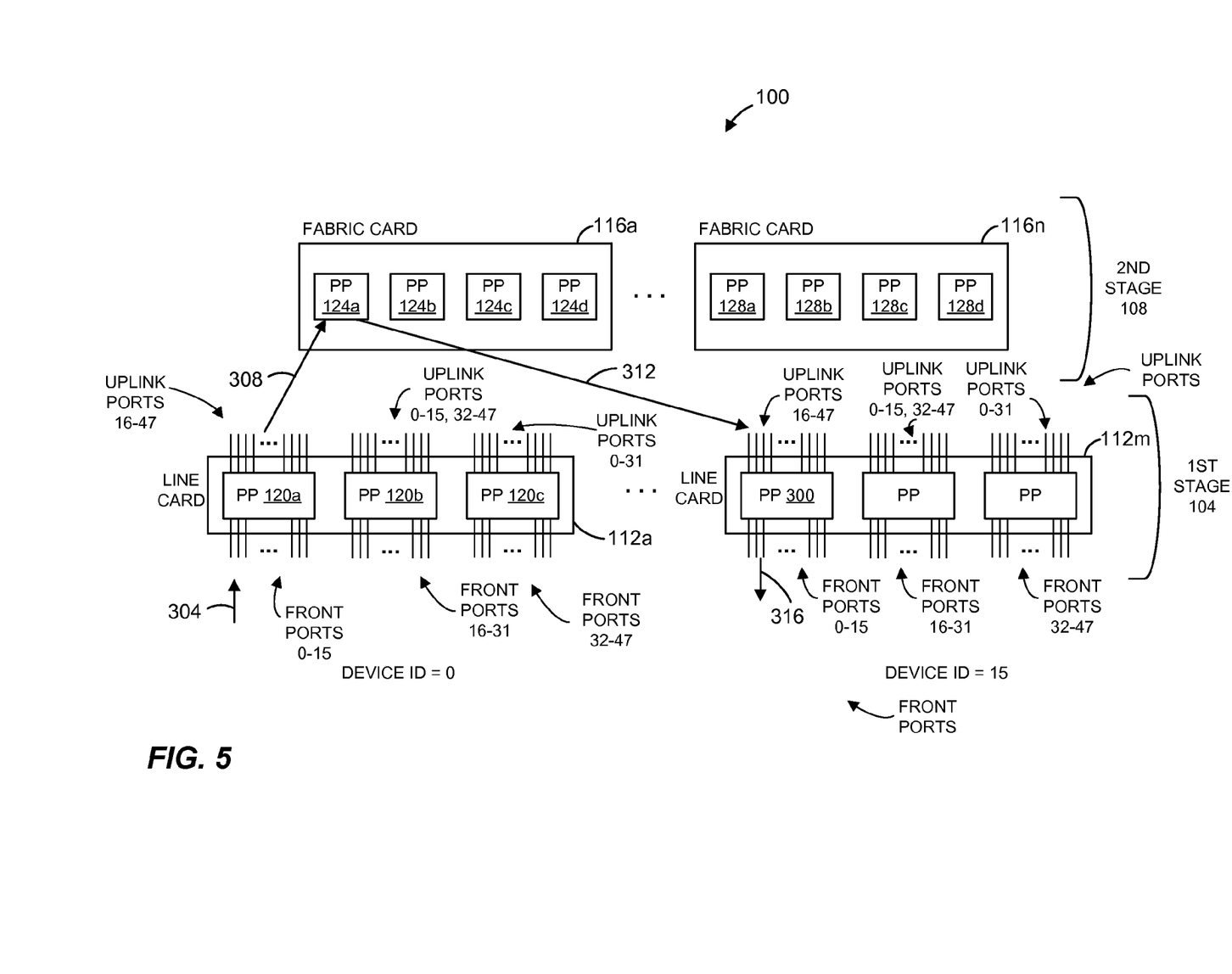
FIG. 5 is a further illustration of a data unit being forwarded through the system of FIG. 1, in accordance with an embodiment of the disclosure.

FIG. 5 is an illustration of a data unit being forwarded through the system 100 of FIG. 1, in which the PPs implement the method 200 of FIG. 3. FIG. 5 is discussed with respect to acts that occur while the data unit is being processed by the system 100. In FIG. 5, it is assumed that the line card 112*a* corresponds to device ID 0 and that source ports 1-15 and target ports 16-47 of PP 120*a* are enabled for device map lookup. It is also assumed that line card 112*m* corresponds to device ID 15, and that target port 10 of PP 300 is not enabled for device map lookup.

At act 304, the data unit is received via port number 5 of the PP 120*a*. The PP 120*a* processes the data unit and makes a forwarding decision, deciding, in the example seen, that the target device ID is 15 and the target port ID is 10. The PP 120*a* then adds a forwarding tag to a header of the data unit.

Because the target device ID is different than the device ID of the PP 120*a*, the PP 120*a* performs a device map lookup based at least on the target device ID, or based at least on the target device ID and the target port ID. The PP 120*a* determines the egress port number is 25 based on the device map lookup. Thus, at act 308, the PP 120*a* transmits the data unit to the PP 124*a* in the fabric card 116*a* via uplink port 25.

Because the target device ID is different than the device ID corresponding to the PP 124*a*, the PP 124*a* performs a device map lookup using information in the forwarding tag, and determines an egress port via which the data unit should be transmitted. Thus, at act 312, the PP 124*a* transmits the data unit to the PP 300.

Because, in the example, the target device ID is 10, and because the target port ID is not enabled for device map lookup, the PP 300 does not perform a device map lookup. Rather, the PP 300 transmits the data unit via the port indicated by the target port ID, which corresponds to one of the front ports of the PP 300. Prior to transmitting the data unit, the PP 300 strips the forwarding tag from the data unit. At act 316, the PP 300 transmits the data unit via the front port 10 of the line card 112*m*.

Because the target device ID is 0, and because the target port ID is not enabled for device map lookup, the PP 120*b* does not perform a device map lookup. Rather, the PP 120*b* transmits the data unit via the port indicated by the target port ID, which corresponds to one of the front ports of the PP 120*b*. Prior to transmitting the data unit, the PP 120*b* strips the forwarding tag from the data unit. At act 262, the PP 120*b* transmits the data unit via the front port 20 of the line card 112*a*.

In some embodiments, load balancing is performed by a PP in the first stage 104 and/or a PP in the second stage 108. For example, with respect to PPs in the first stage 104, uplink ports can be arranged into groups (referred to herein as trunks), and each trunk may be associated with a trunk ID. Each trunk has port members, and the port members of a trunk can be indicated in a trunk member table.

In embodiments utilizing load balancing, the device map tables discussed above may include trunk IDs as opposed to egress port IDs. Thus, the result of a device map table look up with respect to a received data unit may be a trunk ID. Next, one of the port members of the trunk is selected (e.g., using the trunk member table) to facilitate load balancing. In an embodiment, a port member of the trunk is selected based on a source port associated with the data unit. Then, the data unit is transmitted via the selected port member.

Figure 6:
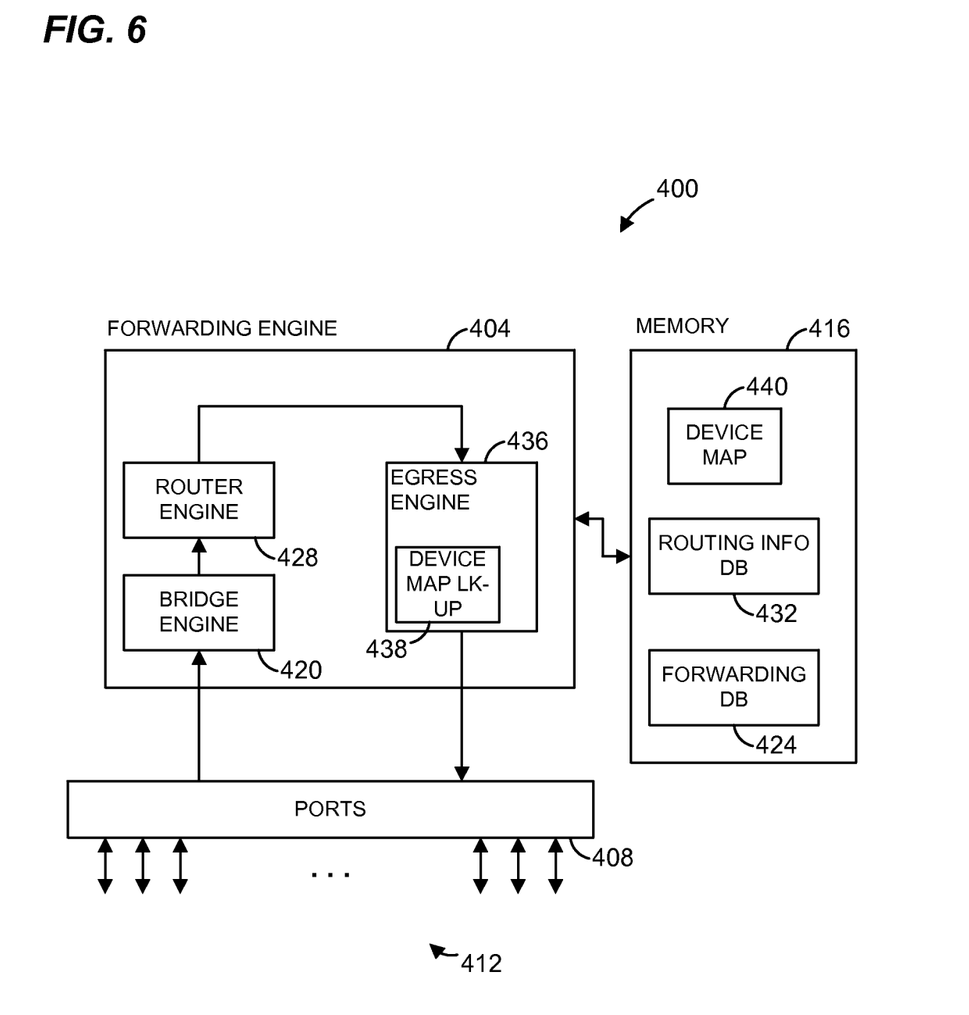
FIG. 6 is a block diagram of an example switching device that is suitable for use as a PP in the system of FIG. 1, in accordance with an embodiment of the disclosure.

FIG. 6 is a block diagram of an example switching device 400 that is suitable to be utilized for each PP in the first stage 104 of the system 100 of FIG. 1, in accordance with an embodiment of the disclosure. The switching device 400 that can also be utilized for each PP in the second stage 108 of the system 100 of FIG. 1, although the same switching device need not be used in the first stage 104 and the second stage 108.

The switching device 400 includes a forwarding engine 404 coupled to a plurality of ports 408. If the switching device 400 is utilized in the first stage 104, the plurality of ports 408 includes a first subset of ports that are front ports, and a second subset of ports that are uplink ports. The plurality of ports 408 are coupled to a plurality of communication links. If the switching device 400 is utilized in the first stage 104, the plurality of ports 412 includes front port links and uplinks.

The forwarding engine 404 is also coupled to a memory 416 that includes information utilized by the forwarding engine 404 when the forwarding engine processes a data unit.

The forwarding engine 404 includes a bridge engine 420. The bridge engine 420 is coupled to a forwarding database that includes MAC addresses and target device and target port indicators (e.g., target device IDs and target port IDs) corresponding to the MAC addresses. The bridge engine 420 generally determines the target device ID and target port ID for a data unit received via a front port based at least on a destination MAC address of the data unit. The bridge engine 420 may utilize other information as well, such as virtual local area network (VLAN) information. In an embodiment, the bridge engine 420 adds a forwarding tag to a header of the data unit, or to a descriptor corresponding to the data unit.

The forwarding database 424 is included in the memory 416. In an embodiment, the memory 416 includes multiple devices, such as one or more ternary content addressable memories (TCAMs). In an embodiment, the forwarding database 424 comprises a TCAM and the bridge engine 420 utilizes the TCAM of the forwarding database 424 to determine the target device ID and the target port ID for a data unit.

The forwarding engine 404 seen in FIG. 6 also includes a router engine 428 coupled to the bridge engine 420. If a received data unit is not destined for a network to which the switching system 100 is connected, then routing based on an Internet Protocol (IP) address may be performed. The router engine 428 is coupled to a routing information database 432 that includes information corresponding to where IP packets should be forwarded. The router engine 428 generally determines to where a received IP packet should be routed. This may be done by examining the IP destination address of the packet and routing information stored in the routing information database. The router engine 428 also maintains the routing information database. In an embodiment, the router engine 428 determines the target device ID and target port ID for a data unit received via a front port based at least on an IP address of the data unit. In an embodiment, the routing information database 432 comprises a TCAM and the router engine 428 utilizes the TCAM of the routing information database 432 to determine the target device ID and the target port ID for a data unit.

The forwarding engine 404 further includes an egress engine 436. The egress engine 436 determines a local egress port via which the data unit should be transmitted based at least on the target device ID, or based on at least the target device ID and the target port ID. In an embodiment, the egress engine 436 includes a device map lookup block that utilizes a device map table 440 similar to a device map table described above with respect to Table 1 or Table 2 to determine the local egress port, at least in some circumstances. In an embodiment, the egress engine 436 may implement the method 200 of FIG. 3. Thus, in an embodiment, the device map lookup block 438 is configured to perform a device map lookup even when the target device ID is the same as the device ID corresponding to the switching device 400. As discussed above with respect to FIG. 4, this can facilitate directing a data unit through a multi-stage switching system in which a group of switching devices (e.g., on a line card) are associated with a single device ID.

The device map 440 is included in the memory 416. In an embodiment, the device map 440 comprises a TCAM and the device map lookup block 438 utilizes the TCAM of the of the device map 440 to determine the egress port ID corresponding to the target device ID or corresponding to the target device ID and the target port ID in the forwarding tag of the data unit.

The memory 416 generally includes memory for storing databases or tables utilized by the forwarding engine 404, such as the forwarding database 424, the routing information database 432, the device map table 440, a next hop table, VLAN data, multicast group data, etc. As discussed above, the memory 416 may include one or more TCAMs, for example, to store one or more of forwarding database data, routing information data, next hop data, VLAN data, multicast group data, etc.

In operation, when a data unit is received via a front port, the bridge engine 420 or the router engine 428, using the forwarding database 424 or routing information database 432, respectively, determines a target device ID and target port ID for the data unit. The bridge engine 420 or the router engine 428 then adds a forwarding tag to a header of the data unit, or to a descriptor associated with the data unit. The forwarding tag includes the target device ID and the target port ID.

The egress engine 436 then uses information in the forwarding tag to determine an egress port of the switching device 400 via which the data unit should be transmitted. For example, the device map lookup block 438 may utilize at least the target device ID, or at least the target device ID and the target port ID to lookup an egress port ID in the device map 440. As discussed above, in an embodiment, the device map lookup block 438 looks up an egress port ID in the device map 440 even when the target device ID is the same as the device ID corresponding to the switching device 400. Next, the egress engine 436 causes the data unit to be transmitted via the determined egress port. If the switching device 400 is utilized in a line card such as a line card 112 (FIG. 2) and if the target device ID/target port ID corresponds to another switching device on the same line card 112 or a different line card 112, the determined egress port may be a port coupled to the second stage 108. In this case, the switching device 400 forwards the data unit to one of the fabric cards 116. In an embodiment, if the target device ID/target port ID corresponds to the same switching device 400, the determined egress port is a port corresponding to a front port of the line card 112. In another embodiment, if the target device ID/target port ID corresponds to the same switching device 400, the determined egress port is a port coupled to the second stage 108. In this case, the switching device 400 forwards the data unit to one of the fabric cards 116. The fabric card 116 would then direct the data unit back to the switching device 400, which in turn would direct the data unit to a port corresponding to a front port of the line card 112.

When a data unit that already has a forwarding tag is received via one of the ports 412, the data unit need not be processed by the bridge engine 420 and the router engine 428. In this case, the egress engine 436 uses information in the forwarding tag to determine an egress port of the switching device 400 via which the data unit should be transmitted. For example, in an embodiment, the device map lookup block 438 utilizes at least the target device ID, or at least the target device ID and the target port ID to lookup an egress port ID in the device map 440 at least in some circumstances. As discussed above, in an embodiment, the device map lookup block 438 looks up an egress port ID in the device map 440 even when the target device ID is the same as the device ID corresponding to the switching device 400 at least in some circumstances. Next, the egress engine 436 causes the data unit to be transmitted via the determined egress port. If the switching device 400 is utilized in a fabric card such as a fabric card 116 (FIG. 2) and if the target device ID/target port ID corresponds to a line card 112, the determined egress port will be a port coupled to the first stage 104. In this case, the switching device 400 forwards the data unit to an appropriate one of the line cards 112.

In an embodiment, if the switching device 400 is utilized in a line card such as a line card 112 (FIG. 2), when a data unit that already has a forwarding tag is received via one of the ports 412 and if the target device ID/target port ID corresponds to the same switching device 400, the determined egress port is a port corresponding to a front port of the line card 112.

Figure 7:
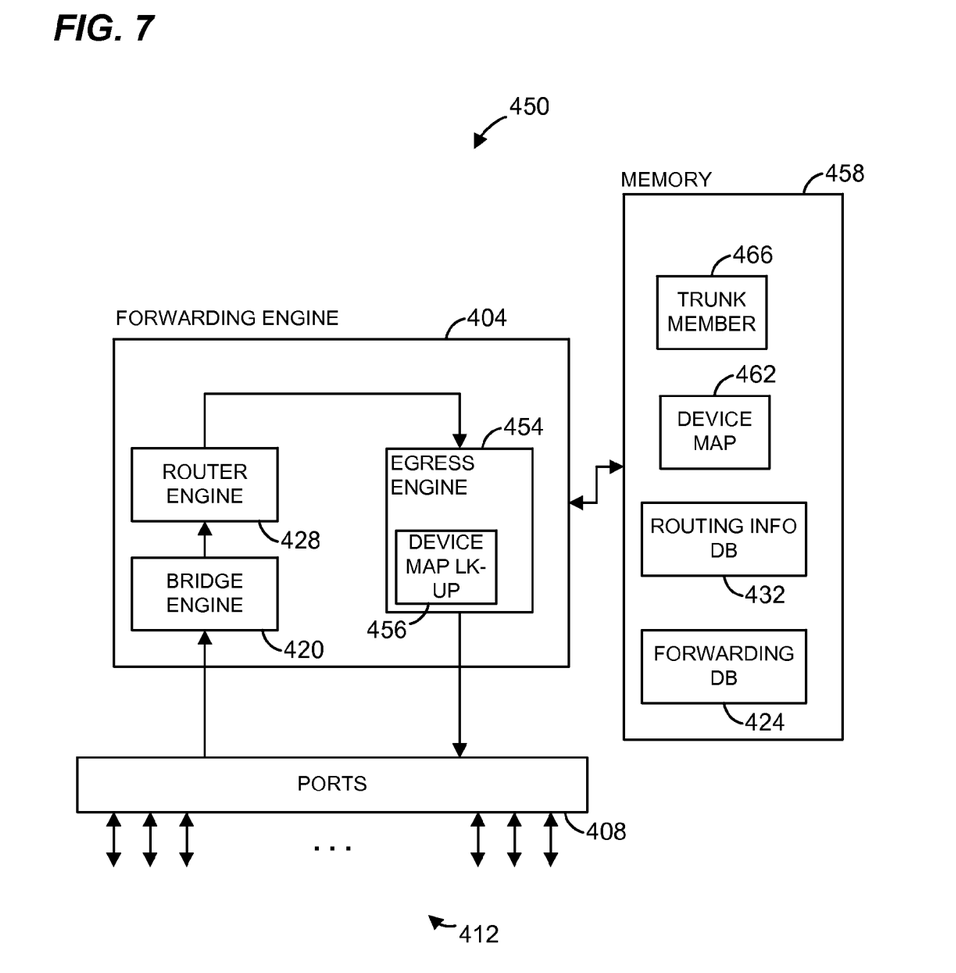
FIG. 7 is a block diagram of another example switching device that is suitable for use as a PP in the system of FIG. 1, in accordance with an embodiment of the disclosure.

FIG. 7 is a block diagram of another example switching device 450 that is suitable for use as a PP in the system 100 of FIG. 1. The switching device 450 is similar to the switching device 400 of FIG. 6, and like-numbered elements may be the same as in FIG. 6.

The switching device 450 includes an egress engine 454 that determines a local trunk via which the data unit should be transmitted based at least on the target device ID, or based on at least the target device ID and the target port ID. In an embodiment, the egress engine 454 includes a device map lookup block 456 that utilizes a device map table 462 to determine the local egress port, at least in some circumstances, the device table 462 being similar to a device map table described above with respect to Table 1 or Table 2, but storing trunk IDs.

The egress engine 454 also determines trunk member port via which the data unit should be transmitted to facilitate load balancing. For example, the memory 458 may include a trunk member table 466 that stores egress port IDs corresponding to each trunk. The device map lookup block 456 utilizes at least the determined trunk ID and a source port ID to look up an egress port in the trunk member table 466 at least in some circumstances. As discussed above, in an embodiment, the device map lookup block 456 looks up an egress port ID using the device map table 462 and the trunk member table 466 even when the target device ID is the same as the device ID corresponding to the switching device 450. Next, the egress engine 454 causes the data unit to be transmitted via the determined egress port. If the switching device 450 is utilized in a line card such as a line card 112 (FIG. 2) and if the target device ID/target port ID corresponds to another switching device on the same line card 112 or a different line card 112, the determined egress port may be a port coupled to the second stage 108. In this case, the switching device 450 forwards the data unit to one of the fabric cards 116. In an embodiment, if the target device ID/target port ID corresponds to the same switching device 450, the determined egress port is a port corresponding to a front port of the line card 112. In another embodiment, if the target device ID/target port ID corresponds to the same switching device 450, the determined egress port is a port coupled to the second stage 108. In this case, the switching device 450 forwards the data unit to one of the fabric cards 116. The fabric card 116 would then direct the data unit back to the switching device 450, which in turn would direct the data unit to a port corresponding to a front port of the line card 112.

When a data unit that already has a forwarding tag is received via one of the ports 412, the egress engine 454 uses information in the forwarding tag to determine an egress port of the switching device 450 via which the data unit should be transmitted. For example, in an embodiment, the device map lookup block 456 utilizes at least the target device ID, or at least the target device ID and the target port ID to determine an egress port ID using the device map table 462 and the trunk member table 466 at least in some circumstances. As discussed above, in an embodiment, the device map lookup block 456 looks up an egress port ID using the device map table 462 and the trunk member table 466 even when the target device ID is the same as the device ID corresponding to the switching device 450. Next, the egress engine 436 causes the data unit to be transmitted via the determined egress port. If the switching device 450 is utilized in a fabric card such as a fabric card 116 (FIG. 2) and if the target device ID/target port ID corresponds to a line card 112, the determined egress port will be a port coupled to the first stage 104. In this case, the switching device 450 forwards the data unit to an appropriate one of the line cards 112.

In an embodiment, if the switching device 450 is utilized in a line card such as a line card 112 (FIG. 2), when a data unit that already has a forwarding tag is received via one of the ports 412 and if the target device ID/target port ID corresponds to the same switching device 450, the determined egress port is a port corresponding to a front port of the line card 112.

Each of the blocks of FIGS. 1, 2, and 4-7, and the method 200 of FIG. 3 may be implemented by hardware. More generally, however, the blocks of FIGS. 1, 2, and 4-7, and the method 200 of FIG. 3 may be implemented using hardware, a processor executing firmware instructions, a processor executing software instructions, or any combination thereof. When a block is implemented at least partially using a processor that executes software instructions, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software instructions may be delivered to a user or a system via any known or desired delivery method including, for example, on a computer readable disk or other transportable computer storage mechanism or via communication media. When implemented in hardware, the hardware may comprise one or more of discrete components, an integrated circuit, an application-specific integrated circuit (ASIC), etc. Referring to FIG. 1, in accordance with and embodiment, each PP is implemented on a single integrated circuit (IC). Similarly, in an embodiment, each of the switching devices of FIGS. 6 and 7 can be implemented on a single integrated circuit (IC). In another embodiment, each PP or each switching device 400, 450 can be implemented on a plurality of separate ICs. In yet another embodiment, multiple PPs may be implemented on a single IC.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A multi-stage switching system, comprising:
a first stage comprising a plurality of groups of switching devices, wherein each group of switching devices includes more than one switching device, and wherein each group of switching devices is associated with a corresponding single device identifier (ID); and
a second stage comprising a plurality of switching devices;
wherein the switching devices of the first stage are coupled to the switching devices of the second stage via a plurality of uplinks;
wherein the switching devices of the first stage are configured to associate a target device ID and a target port ID to a data unit received via a front port of the switching system, wherein the target device ID corresponds to a device identifier associated with one of the groups of switching devices to which the data unit should be forwarded, and wherein the target port identifier identifies a port within the one group of switching devices; and
wherein the switching devices of the first stage and the switching devices of the second stage are configured to direct the data unit through the switching system using the target device ID and the target port ID;
wherein each switching device in the each group of switching devices has a plurality of ports, including front ports, associated with a plurality of corresponding port identifiers (IDs), and wherein port IDs of each group of switching devices are not unique within the groups of switching devices;
wherein each front port in each group has a corresponding port ID that is unique among the front ports of the group of switching devices.

2. The multi-stage switching system according to claim 1, wherein each switching device in each group of switching devices includes a plurality of uplink ports;
wherein the port IDs corresponding to the uplink ports of each switching device in each group of switching devices are the same as the port IDs of front ports corresponding to other switching devices in the group of switching devices.

3. The multi-stage switching system according to claim 1, wherein each switching device is configured to determine an egress port of the switching device via which the data unit should be transmitted using at least the target device ID.

4. The multi-stage switching system according to claim 3, wherein each switching device is configured to determine the egress port of the switching device via which the data unit should be transmitted additionally using at least the target port ID.

5. The multi-stage switching system according to claim 3, wherein each of at least some of the switching devices is configured to determine a trunk via which the data unit should be transmitted using at least the target device ID, wherein the trunk comprises a plurality of member ports, and is configured to choose one of the member ports as the egress port of the switching device via which the data unit should be transmitted.

6. The multi-stage switching system according to claim 5, wherein each of at least some of the switching devices is configured to choose one of the member ports as the egress port of the switching device via which the data unit should be transmitted based on a source port via which the data unit was received.

7. The multi-stage switching system according to claim 1, wherein each group of switching devices in the first stage is implemented on a corresponding line card of a chassis switch.

8. The multi-stage switching system according to claim 7, wherein the plurality of switching devices of the second stage is implemented on a plurality of fabric cards of the chassis switch.

9. A switching device, comprising:
a plurality of ports;
a memory;
a forwarding engine coupled to the plurality of ports and to the memory, the forwarding engine including:
an egress engine to determine an egress port via which a data unit having a forwarding tag is to be transmitted, wherein the forwarding tag includes a target device identifier (ID) and a target port ID, wherein the data unit is received by the switching device via one of the ports in the plurality of ports, and wherein the target device ID identifies the switching device to which the data unit is directed and the target port ID identifies a port of the switching device identified by the target device ID;
wherein, when the target device ID is a device ID of the switching device, the egress engine is configured to:
determine whether device map lookup is enabled for (i) the one port via which the data unit was received and (ii) a port corresponding to the target port ID in the forwarding tag of the data unit,
utilize a device map table stored in the memory to determine the egress port via which the data unit should be transmitted when it is determined that device map lookup is enabled for both of (i) the one port via which the data unit was received and (ii) the port corresponding to the target port ID in the forwarding tag of the data unit,
transmit the data unit via the egress port determined using the device map table when it is determined that device map lookup is enabled for both of (i) the one port via which the data unit was received and (ii) the port corresponding to the target port ID in the forwarding tag of the data unit, and
transmit the data unit via the port corresponding to the target port ID in the forwarding tag of the data unit when it is determined that device map lookup is not enabled for either of (i) the one port via which the data unit was received or (ii) the port corresponding to the target port ID in the forwarding tag of the data unit.

10. The switching device according to claim 9, wherein the egress engine is configured to determine the egress port based on performing a lookup in the device map table based on at least one of the target device ID and the target port ID.

11. The switching device according to claim 9, wherein the egress engine is configured to:
utilize the device map table to determine a trunk ID of a trunk having a plurality of port members, and
determine the egress port as one of the plurality of port members of the trunk corresponding to the trunk ID.

12. The switching device according to claim 11, wherein the egress engine is configured to determine the egress port as one of the plurality of port members of the trunk corresponding to the trunk ID by performing a lookup in a trunk member table based on at least a source port via which the data unit was received.

13. The switching device according to claim 9, wherein the forwarding engine includes a bridge engine configured to determine the target device ID and the target port ID of the data unit and to associate the forwarding tag with the data unit.

14. A switching method, comprising:
receiving a data unit via a port of a switching device in a multi-stage switching system, the data unit associated with a forwarding tag having at least a target device identifier (ID) that identifies a switching device to which the data unit is directed;
determining whether the target device identifier (ID) in the forwarding tag is the same as a device ID of the switching device;
when the target device ID is the same as the device ID of the switching device:
determining whether a device map lookup is enabled for (i) the port via which the data unit was received and (ii) a port corresponding to a target port ID in the forwarding tag associated with the data unit,
utilizing a device map table stored in a memory of the switching device to determine an egress port via which the data unit should be transmitted when it is determined that device map lookup is enabled for both of (i) the port via which the data unit was received and (ii) the port corresponding to the target port ID,
transmitting the data unit via the egress port determined using the device map table when it is determined that the device map lookup is enabled for both of (i) the port via which the data unit was received and (ii) the port corresponding to the target port ID in the forwarding tag of the data unit, and transmitting the data unit via the port corresponding to the target port ID in the forwarding tag when it is determined that the device map lookup is not enabled for either of (i) the port via which the data unit was received or (ii) the port corresponding to the target port ID in the forwarding tag of the data unit, wherein the target port ID identifies a port of the switching device identified by the target device ID.

15. The method according to claim 14, wherein utilizing the device map table to determine the egress port comprises performing a lookup in the device map table based on at least one of the target device ID and the target port ID.

16. The method according to claim 14, wherein utilizing the device map table to determine the egress port comprises:
    utilizing the device map table to determine a trunk ID of a trunk of the switching device having a plurality of port members, and
    determining the egress port as one of the plurality of port members of the trunk corresponding to the trunk ID.

17. The method according to claim 14, further comprising:
    determining the target device ID and the target port ID of the data unit; and
    associating the forwarding tag with the data unit.

* * * * *